US008370284B2

(12) United States Patent  
Garg et al.

(10) Patent No.: US 8,370,284 B2
(45) Date of Patent: *Feb. 5, 2013

(54) SYSTEM AND METHOD FOR FINDING DESIRED RESULTS BY INCREMENTAL SEARCH USING AN AMBIGUOUS KEYPAD WITH THE INPUT CONTAINING ORTHOGRAPHIC AND/OR TYPOGRAPHIC ERRORS

(75) Inventors: Pankaj Garg, Patiala (IN); Sashikumar Venkataraman, Andover, MA (US); Gopal Mishrimalji Rajpurohit, Di Kheda (IN)

(73) Assignee: Veveo, Inc., Andover, MA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/642,173

(22) Filed: Dec. 18, 2009

(65) Prior Publication Data

US 2010/0153380 A1 Jun. 17, 2010

Related U.S. Application Data

(63) Continuation of application No. 11/561,197, filed on Nov. 17, 2006, now Pat. No. 7,644,054.

(60) Provisional application No. 60/739,893, filed on Nov. 23, 2005.

(51) Int. Cl.
*G06N 5/02* (2006.01)
(52) U.S. Cl. ............... 706/46; 725/51; 725/63; 707/769
(58) Field of Classification Search ............ 706/46; 725/51, 53; 707/769
See application file for complete search history.

(56) References Cited

U.S. PATENT DOCUMENTS

| 1,261,167 A | 4/1918 | Russell |
| 4,453,217 A | 6/1984 | Boivie |
| 4,760,528 A | 7/1988 | Levin |
| 4,797,855 A * | 1/1989 | Duncan et al. ................ 715/236 |

(Continued)

FOREIGN PATENT DOCUMENTS

| EP | 181058 | 5/1986 |
| EP | 1050794 | 11/2000 |

(Continued)

OTHER PUBLICATIONS

Ardissono, L. et al., User Modeling and Recommendation Techniques for Personalized Electronic Program Guides, Personalized Digital Television, Editors: Ardissono, et al., Kluwer Academic Press, 2004.

(Continued)

*Primary Examiner* — Kakali Chaki
*Assistant Examiner* — Mai T Tran
(74) *Attorney, Agent, or Firm* — Wilmer Cutler Pickering Hale & Dorr LLP.

(57) ABSTRACT

A system for finding and presenting content items in response to keystrokes entered by a user on an input device having a known layout of overloaded keys selected from a set of key layouts. The system includes a database containing content items and terms characterizing the content items; input logic for receiving keystrokes from the user and building a string corresponding to incremental entries by the user, each item in the string having the set of alphanumeric symbols associated with a corresponding keystroke; mapping logic to map the string to the database to find the most likely content items corresponding to the incremental entries, the mapping logic operating in accordance with a defined error model corresponding to the known layout of overloaded keys; and presentation logic for ordering the most likely content items identified by the mapping logic and for presenting the most likely content items.

10 Claims, 6 Drawing Sheets

U.S. PATENT DOCUMENTS

| | | | |
|---|---|---|---|
| 4,893,238 A | 1/1990 | Venema |
| 5,224,060 A | 6/1993 | Ma et al. |
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,623,406 A | 4/1997 | Ichbiah |
| 5,635,989 A | 6/1997 | Rothmuller |
| 5,745,889 A | 4/1998 | Burrows |
| 5,774,588 A | 6/1998 | Li |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,880,768 A | 3/1999 | Lemmons et al. |
| 5,912,664 A | 6/1999 | Eick et al. |
| 5,930,788 A | 7/1999 | Wical |
| 5,937,422 A | 8/1999 | Nelson et al. |
| 5,945,928 A | 8/1999 | Kushler et al. |
| 5,945,987 A | 8/1999 | Dunn |
| 5,953,541 A * | 9/1999 | King et al. .............. 710/67 |
| 6,005,565 A | 12/1999 | Legall et al. |
| 6,005,597 A | 12/1999 | Barrett et al. |
| 6,006,225 A | 12/1999 | Bowman et al. |
| 6,009,459 A | 12/1999 | Belfiore et al. |
| 6,011,554 A | 1/2000 | King et al. |
| 6,047,300 A | 4/2000 | Walfish et al. |
| 6,075,526 A | 6/2000 | Rothmuller |
| 6,133,909 A | 10/2000 | Schein et al. |
| 6,184,877 B1 | 2/2001 | Dodson et al. |
| 6,189,002 B1 | 2/2001 | Roitblat |
| 6,204,848 B1 | 3/2001 | Nowlan et al. |
| 6,223,059 B1 | 4/2001 | Haestrup |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,307,548 B1 | 10/2001 | Flinchem et al. |
| 6,307,549 B1 | 10/2001 | King et al. |
| 6,360,215 B1 | 3/2002 | Judd et al. |
| 6,377,945 B1 | 4/2002 | Risvik |
| 6,385,602 B1 | 5/2002 | Tso et al. |
| 6,438,751 B1 | 8/2002 | Voyticky et al. |
| 6,463,586 B1 | 10/2002 | Jerding |
| 6,466,933 B1 | 10/2002 | Huang et al. |
| 6,529,903 B2 | 3/2003 | Smith |
| 6,564,213 B1 | 5/2003 | Ortega et al. |
| 6,564,313 B1 | 5/2003 | Kashyap |
| 6,594,657 B1 | 7/2003 | Livowsky et al. |
| 6,600,496 B1 | 7/2003 | Wagner et al. |
| 6,614,455 B1 | 9/2003 | Cuijpers et al. |
| 6,615,248 B1 | 9/2003 | Smith |
| 6,631,496 B1 | 10/2003 | Li et al. |
| 6,664,980 B2 | 12/2003 | Bryan et al. |
| 6,721,954 B1 | 4/2004 | Nickum |
| 6,732,369 B1 | 5/2004 | Schein et al. |
| 6,734,881 B1 | 5/2004 | Will |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith |
| 6,865,746 B1 | 3/2005 | Herrington et al. |
| 6,907,273 B1 | 6/2005 | Smethers |
| 6,965,374 B2 | 11/2005 | Villet et al. |
| 6,999,959 B1 | 2/2006 | Lawrence et al. |
| 7,013,304 B1 | 3/2006 | Schuetze et al. |
| 7,117,207 B1 | 10/2006 | Kerschberg et al. |
| 7,136,854 B2 | 11/2006 | Smith |
| 7,149,983 B1 | 12/2006 | Robertson et al. |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 7,461,061 B2 | 12/2008 | Aravamudan et al. |
| 7,509,313 B2 | 3/2009 | Colledge et al. |
| 7,529,744 B1 | 5/2009 | Srivastava et al. |
| 7,536,384 B2 | 5/2009 | Venkataraman et al. |
| 7,539,676 B2 | 5/2009 | Aravamudan et al. |
| 7,548,915 B2 | 6/2009 | Ramer et al. |
| 7,644,054 B2 | 1/2010 | Garg et al. |
| 7,657,526 B2 | 2/2010 | Aravamudan et al. |
| 7,679,534 B2 | 3/2010 | Kay et al. |
| 7,683,886 B2 | 3/2010 | Willey |
| 7,712,053 B2 | 5/2010 | Bradford et al. |
| 7,779,011 B2 | 8/2010 | Venkataraman et al. |
| 7,788,266 B2 | 8/2010 | Venkataraman et al. |
| 2002/0002550 A1 | 1/2002 | Berman |
| 2002/0042791 A1 | 4/2002 | Smith et al. |
| 2002/0049752 A1 | 4/2002 | Bowman et al. |
| 2002/0052873 A1 | 5/2002 | Delgado et al. |
| 2002/0059621 A1 | 5/2002 | Thomas et al. |
| 2002/0077143 A1 | 6/2002 | Sharif et al. |
| 2002/0083448 A1 | 6/2002 | Johnson |
| 2002/0133481 A1 | 9/2002 | Smith et al. |
| 2002/0184373 A1 | 12/2002 | Maes |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0033292 A1 | 2/2003 | Meisel et al. |
| 2003/0037043 A1 | 2/2003 | Chang et al. |
| 2003/0046698 A1 | 3/2003 | Kamen et al. |
| 2003/0066079 A1 | 4/2003 | Suga |
| 2003/0084270 A1 | 5/2003 | Coon et al. |
| 2003/0226146 A1 | 12/2003 | Thurston et al. |
| 2003/0237096 A1 | 12/2003 | Barrett et al. |
| 2004/0021691 A1 | 2/2004 | Dostie et al. |
| 2004/0046744 A1 | 3/2004 | Rafii et al. |
| 2004/0049783 A1 | 3/2004 | Lemmons et al. |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0139091 A1 | 7/2004 | Shin |
| 2004/0143569 A1 | 7/2004 | Gross et al. |
| 2004/0155908 A1 | 8/2004 | Wagner |
| 2004/0194141 A1 | 9/2004 | Sanders |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0071874 A1 | 3/2005 | Elcock et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0174333 A1 | 8/2005 | Robinson et al. |
| 2005/0192944 A1 | 9/2005 | Flinchem |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0013487 A1 | 1/2006 | Longe et al. |

| | | | |
|---|---|---|---|
| 2006/0015906 A1 | 1/2006 | Boyer et al. | |
| 2006/0029296 A1* | 2/2006 | King et al. | 382/313 |
| 2006/0036640 A1 | 2/2006 | Tateno et al. | |
| 2006/0059044 A1 | 3/2006 | Chan et al. | |
| 2006/0069616 A1 | 3/2006 | Bau | |
| 2006/0075429 A1 | 4/2006 | Istvan et al. | |
| 2006/0090182 A1 | 4/2006 | Horowitz et al. | |
| 2006/0090185 A1 | 4/2006 | Zito et al. | |
| 2006/0101499 A1 | 5/2006 | Aravamudan et al. | |
| 2006/0101503 A1 | 5/2006 | Venkataraman | |
| 2006/0101504 A1 | 5/2006 | Aravamudan et al. | |
| 2006/0112162 A1 | 5/2006 | Marot et al. | |
| 2006/0117019 A1 | 6/2006 | Sylthe et al. | |
| 2006/0161520 A1 | 7/2006 | Brewer et al. | |
| 2006/0163337 A1 | 7/2006 | Unruh | |
| 2006/0167676 A1 | 7/2006 | Plumb | |
| 2006/0167859 A1 | 7/2006 | Verbeck Sibley et al. | |
| 2006/0173818 A1 | 8/2006 | Berstis et al. | |
| 2006/0176283 A1 | 8/2006 | Suraqui | |
| 2006/0190308 A1 | 8/2006 | Janssens et al. | |
| 2006/0195435 A1 | 8/2006 | Laird-McConnell et al. | |
| 2006/0206454 A1 | 9/2006 | Forstall et al. | |
| 2006/0206815 A1 | 9/2006 | Pathiyal et al. | |
| 2006/0248078 A1 | 11/2006 | Gross et al. | |
| 2006/0256078 A1 | 11/2006 | Flinchem et al. | |
| 2006/0259479 A1 | 11/2006 | Dai | |
| 2006/0274051 A1 | 12/2006 | Longe et al. | |
| 2007/0005563 A1 | 1/2007 | Aravamudan | |
| 2007/0016476 A1 | 1/2007 | Hoffberg et al. | |
| 2007/0016862 A1 | 1/2007 | Kuzmin | |
| 2007/0027852 A1 | 2/2007 | Howard et al. | |
| 2007/0043750 A1 | 2/2007 | Dingle | |
| 2007/0050337 A1 | 3/2007 | Venkataraman et al. | |
| 2007/0050348 A1 | 3/2007 | Aharoni et al. | |
| 2007/0061244 A1 | 3/2007 | Ramer et al. | |
| 2007/0061317 A1 | 3/2007 | Ramer et al. | |
| 2007/0061321 A1 | 3/2007 | Venkataraman | |
| 2007/0061753 A1 | 3/2007 | Ng et al. | |
| 2007/0061754 A1 | 3/2007 | Ardhanari et al. | |
| 2007/0067272 A1 | 3/2007 | Flynt et al. | |
| 2007/0074131 A1 | 3/2007 | Assadollahi | |
| 2007/0088681 A1 | 4/2007 | Aravamudan et al. | |
| 2007/0094024 A1 | 4/2007 | Kristensson et al. | |
| 2007/0100650 A1 | 5/2007 | Ramer et al. | |
| 2007/0130128 A1 | 6/2007 | Garg et al. | |
| 2007/0143567 A1 | 6/2007 | Gorobets | |
| 2007/0150606 A1 | 6/2007 | Flinchem et al. | |
| 2007/0219984 A1 | 9/2007 | Aravamudan et al. | |
| 2007/0219985 A1 | 9/2007 | Aravamudan et al. | |
| 2007/0226649 A1 | 9/2007 | Agmon | |
| 2007/0240045 A1 | 10/2007 | Fux et al. | |
| 2007/0255693 A1 | 11/2007 | Ramaswamy et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288456 A1 | 12/2007 | Aravamudan et al. | |
| 2007/0288457 A1 | 12/2007 | Aravamudan et al. | |
| 2008/0065617 A1 | 3/2008 | Burke et al. | |
| 2008/0071771 A1 | 3/2008 | Venkataraman et al. | |
| 2008/0077577 A1 | 3/2008 | Byrne et al. | |
| 2008/0086704 A1 | 4/2008 | Aravamudan | |
| 2008/0114743 A1 | 5/2008 | Venkataraman et al. | |
| 2008/0177717 A1 | 7/2008 | Kumar et al. | |
| 2008/0195601 A1 | 8/2008 | Ntoulas et al. | |
| 2008/0209229 A1 | 8/2008 | Ramakrishnan et al. | |
| 2008/0313564 A1 | 12/2008 | Barve et al. | |
| 2009/0077496 A1 | 3/2009 | Aravamudan et al. | |
| 2009/0198688 A1 | 8/2009 | Venkataraman et al. | |
| 2010/0121845 A1 | 5/2010 | Aravamudan et al. | |
| 2010/0153380 A1 | 6/2010 | Garg et al. | |

FOREIGN PATENT DOCUMENTS

| | | |
|---|---|---|
| EP | 1143691 | 10/2001 |
| EP | 1338967 | 8/2003 |
| EP | 1463307 A2 | 9/2004 |
| EP | 1622054 | 2/2006 |
| WO | WO-98/56173 | 12/1998 |
| WO | WO-0070505 | 11/2000 |
| WO | WO-2004010326 | 1/2004 |
| WO | WO-2004/031931 A1 | 4/2004 |
| WO | WO-2005/033967 A3 | 4/2005 |
| WO | WO-2005/084235 A2 | 9/2005 |
| WO | WO-2005084235 | 9/2005 |
| WO | WO-2006/052959 | 5/2006 |
| WO | WO-2006/052966 | 5/2006 |
| WO | WO-2007/025148 | 3/2007 |
| WO | WO-2007/025149 | 3/2007 |
| WO | WO-2007/062035 | 5/2007 |
| WO | WO-2007/118038 | 10/2007 |
| WO | WO-2007/124429 | 11/2007 |
| WO | WO-2007/124436 A2 | 11/2007 |
| WO | WO-2007/131058 | 11/2007 |
| WO | WO-2008/034057 | 3/2008 |
| WO | WO-2008/091941 | 7/2008 |
| WO | WO-2008/148012 | 12/2008 |

OTHER PUBLICATIONS

Dalianis, "Improving search engine retrieval using a compound splitter for Swedish," Abstract of presentation at Nodalida 2005—15th Nordic Conference on Computational Linguistics, Joensuu Finland, May 20-21, 2005. Retrieved Jan. 5, 2006 from http://phon.joensuu.fi/nodalida/abstracts/03.shtml, 3 pages.

Digital Video Broadcasting, http://www.dvb.org (Oct. 12, 2007).

European Search Report for 06838179.7, dated Dec. 9, 2009, 7 pages.

European Search Report for EP 05826129.8 dated Aug. 11, 2009, 15 pages.

GADD, Phonix: The Algorithm, Program, vol. 24(4), Oct. 1990 (pp. 363-369).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/40005, mailed Jul. 3, 2007 (4 Pages).

International Search Report, International Application No. PCT/US07/65703, mailed Jan. 25, 2008 (2 pages).

International Search Report, International Application No. PCT/US07/67100, mailed Mar. 7, 2008 (2 pages).

Mackenzie et al., LetterWise: Prefix-based disambiguation for mobile text input, Proceedings of the ACM Symposium on User Interface Software and Technology—UIST2001, pp. 111-120.

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www.avotaynu.com/soundex.html, retrieved Mar. 19, 2008, last updated Sep. 8, 2007 (6 pages).

Nardi, et al., "Integrating Communication and Information Through Contact Map," Communications of the ACM, vol. 45, No. 4, Apr. 2002, 7 pages, retrieved from URL:http://portal.acm.org/citation.cfm?id+505251.

Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242.

Silfverberg et al., Predicting text entry speed on mobile phones, Proceedings of the ACM Conference on Human Factors in Computing System—Chi, 2000. pp. 1-16.

Supplemental European Search Report for EP 07761026.9 dated Jan. 28, 2010, 8 pages.

Supplemental Partial European Search Report for EP 05826114.0 dated Aug. 20, 2009, 13 pages.

Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.

Wikipedia's entry for Levenshtein distance (n.d.). Retrieved Nov. 15, 2006 from http://en.wikipedia.org/wiki/Levenshtein_distance.

Written Opinion of the International Searching Authority, International Application No. PCT/US06/25249, mailed Jan. 29, 2008 (3 pages).

Written Opinion of the International Searching Authority, International Application No. PCT/US06/33204, mailed Sep. 21, 2007 (3 pages).

Written Opinion of the International Searching Authority, International Application No. PCT/US06/40005, mailed Jul. 3, 2007 (4 Pages).

Written Opinion of the International Searching Authority, ligternational Application No. PCT/US07/65703, mailed Jan. 25, 2008 (3 pages).

Written Opinion of the International Searching Authority, International Application No. PCT/US07/67100, mailed Mar. 7, 2008 (3 pages).

International Search Report and Written Opinion of the International Searching Authority of the United States Patent and Trademark Office for PCT/US2005/040415. dated Nov. 27, 2006, 4 pages.

International Search Report and Written Opinion of the International Searching Authority of the United States Patent and Trademark Office for PCT/US2006/033257, dated Mar. 26, 2008, 5 pages.

International Search Report and Written Opinion of the International Searching Authority of the United States Patent and Trademark Office for PCT/US2006/045053, dated Jul. 24, 2008, 8 pages.

International Search Report and Written Opinion of the International Searching Authority of the United States Patent and Trademark Office for PCT/US2006/33258, dated Mar. 26, 2008, 5 pages.

International Search Report and Written Opinion of the International Searching Authority of the United States Patent and Trademark Office for PCT/US2007/067114, dated Jul. 2, 2008, 4 pages.

International Search Report and Written Opinion of the International Searching Authority of the United States Patent and Trademark Office for PCT/US2007/068064, 9 pages.

International Search Report and Written Opinion of the International Searching Authority of the United States Patent and Trademark Office for PCT/US2007/078490, 4 pages.

International Search Report and Written Opinion of the International Searching Authority of the United States Patent and Trademark Office for PCT/US2008/051789, dated Jul. 14, 2008, 5 pages.

International Search Report and Written Opinion of the International Searching Authority of the United States Patent and Trademark Office for PCT/US2008/064730, dated Sep. 8, 2008, 5 pages.

International Search Report and Written Opinion of the International Searching Authority, the United States Patent and Trademark Office, for International Application No. PCT/US05/40424, dated Nov. 21, 2006, 6 pages.

Review of Personalization Technologies: Collaborative Filtering vs. ChoiceStream's Attributized Bayesian Choice Modelig Technology Brief, ChoiceStream Technologies, Cambridge, MA, Feb. 2004, 13 pages.

Roe, et al., "Mapping UML Models Incorporating OCL Constraints into Object-Z," Technical Report, Sep. 2003, Department of Computing, Imperial College London, retrieved on Jul. 12, 2007 retrieved from the internet: <URL: http://www.doc.ic.ac.uk/-ar3/TechnicalReport2003_9.pdf>, 17 pages.

Supplementary European Search Report and Written Opinion for EP07842499, dated Aug. 25, 2010, 6 pages.

Talbot, David. "Soul of a New Mobile Machine." *Technology Review: The Design Issue* May/Jun. 2007, pp. 46-53.

* cited by examiner

PRIOR ART

| | ABC | DEF |
|---|---|---|
| 1 | 2 | 3 |
| GHI | JKL | MNO |
| 4 | 5 | 6 |
| PQRS | TUV | WXYZ |
| 7 | 8 | 0 |
| CLEAR | space | ENTER |
| | 0 | |

FIG. 6

SYSTEM AND METHOD FOR FINDING DESIRED RESULTS BY INCREMENTAL SEARCH USING AN AMBIGUOUS KEYPAD WITH THE INPUT CONTAINING ORTHOGRAPHIC AND/OR TYPOGRAPHIC ERRORS

CROSS-REFERENCE TO RELATED APPLICATIONS

This application is a continuation of and claims the benefit under 35 U.S.C. §120 of U.S. patent application Ser. No. 11/561,197, filed on Nov. 17, 2006, now U.S. Pat. No. 7,644,054 entitled System And Method For Finding Desired Results By Incremental Search Using An Ambiguous Keypad With The Input Containing Orthographic And Typographic Errors, which claims the benefit under 35 U.S.C. §119(e) of U.S. Provisional Patent Application No. 60/739,893, filed on Nov. 23, 2005, entitled Method and System for Automatic Error Compensation for Phonetic Misspellings During Incremental Searching with Reduced Text Entry, which is herein incorporated by reference in its entirety.

BACKGROUND OF THE INVENTION

1. Field of Invention

The present invention relates generally to performing searches and, more particularly, to a method of finding results by incremental search using a keypad having overloaded keys as the input device when the input contains orthographic and typographic errors.

2. Description of Related Art

Challenges to providing an easy-to-use interface for performing searches on input constrained devices such as television remote controls and mobile devices are many, the key among them being (1) the small form-factor of devices, which makes text input cumbersome, (2) interpreting the ambiguous user input from a text input keypad having overloaded keys (e.g., as shown in FIG. 6), (3) rendering the results on a limited display with the correct ordering so that the user finds the desired results with minimal or reduced input, and (4) misspellings or errors in user input contributed in part by the small form factor of devices (the rest being caused cognitive errors). Some reports indicate that 10-12% of all queries to a search engine are misspelled (Mansour Sarr 2003). The error rate is believed to be even higher when using input constrained devices, where the limitation of inputting text makes them more prone to typographic errors (e.g. multi-press character overshoot for TV remote controls with overloaded keys such as "spejl" instead of "spell", and accidental adjacent character press on phones with crowded keypads). Additionally, users may make orthographic errors, i.e., spelling errors arising from mistakes in cognitive processing, such as simple misspellings or phonetic substitutions (e.g. "Jerry Sienfeld" instead of "Jerry Seinfeld" or "nite" instead of "night"). A method that reduces the number of query characters one needs to input would not only significantly improve the user experience but also reduce the likelihood of more errors due to entry of additional characters.

Though correction methods for orthographic errors (e.g. mistakes due to phonetic errors) and typographic errors (e.g. mistakes due to pressing a key adjacent to the key containing the intended character) are known, none of them perform error correction on input (1) that is itself ambiguous and (2) that contains multiple word queries where one or more of the words are partial prefixes or fragments of the words they represent. While phonetic error corrections algorithms have been in use since 1918 (e.g., U.S. Pat. No. 1,261,167) and various subsequent improvements have been made (e.g., Daitch-Mokotoff Soundex System, Phonix, and Metaphone), the basic notion of phonetic error correction has changed little. The focus of these error correction schemes have been on single complete words. First, they do not perform phonetic correction across multiple words (e.g. "Jery Sienfeld" instead of "Jerry Seinfeld"). Second, they do not perform phonetic error correction methods across multiple word prefixes (e.g. "gar keillor" for "Garrison Keillor". However, according to a Majestic Research Report study done in June 2004, 50% of the search queries done on the web have two or three words, 20% of the searches use just one word, with 5% of the searches having more than six words. This report highlights the need to compensate for errors across multiple words in order to provide a compelling user experience.

Furthermore, even though recent work has been done to improve search engine retrieval using stemming and compound splitting to correct errors across multiple complete words, the techniques are not for incremental searching (results retrieved as each character is input) since the words need to be complete words (see Dalianis, Hercules, "Improving search engine retrieval using a compound splitter for Swedish", Presented at Nodalida 2005—15th Nordic Conference on Computational Linguistics, May 21-22, 2005, Joensuu, Finland). Additionally, they do not address the case of performing error correction across multiple word prefixes ("shyl pcno" for "Shylock Pacino"), which is required when performing an incremental search. They also do not address error correction on input using a keypad with overloaded keys—which is the predominant layout of keys on telephones and remote controls. To summarize, the challenges to compensate for orthographic and typographic errors in an incremental search scheme with reduced text entry needs be addressed by a method (1) that can perform both forms of error compensation (orthographic and typographic) across multiple words of the query, (2) that can perform error compensation for single or multiple word prefixes and/or word fragments where the prefixes and/or fragments themselves have orthographic and typographic errors, (3) that can dynamically compensate for errors during an incremental search as the user types in the single or multiple prefixes constituting the query string, and (4) that can perform these error compensations for an input query that is itself ambiguous as a consequence of the user inputting text with a keypad having overloaded keys.

BRIEF SUMMARY OF THE INVENTION

The invention provides methods and system enabling automatic error compensation for orthographic and typographic misspellings during incremental searching using input provided by a keypad having overloaded keys. Embodiments of the invention may be used with reduced text entry devices and techniques, e.g. text entry using a mobile phone keypad, which has multiple alphanumeric characters assigned to a single key.

In at least one embodiment, a user-interface system incrementally finds and presents one or more content items in response to keystrokes entered by a user on an input device having a known layout of overloaded keys selected from a set of key layouts. Each overloaded key has a corresponding set of alphanumeric symbols. The system includes a database stored in an electronically readable medium; the database contains content items and corresponding descriptive terms that characterize the content items. The system also includes input logic that receives keystrokes from the user and builds a string corresponding to incremental entries by the user. Each item in the string has the set of alphanumeric symbols associated with a corresponding keystroke. The system further includes mapping logic, cooperating with the database, to map the string to the database to find the most likely content items corresponding to the incremental entries. The mapping logic operates in accordance with a defined error model, and the error model corresponds to the known layout of overloaded keys of the input device. The system also includes presentation logic that orders the most likely content items identified by the mapping logic and presents on a display device the most likely content items in accordance with defined ordering criteria. The system operates such that the user-interface system receives ambiguous entries from the user and presents the most likely matching content items.

In other embodiments, the error models include one or a combination of generating typographic variants of the descriptive terms that characterize the content items, generating orthographic variants of the descriptive terms that characterize the content items, generating N-gram variants of the descriptive terms that characterize the content items, wherein the N-gram variants include variants based on nonadjacent characters of the descriptive terms, and/or using distance functions to assign error penalties to errors occurring in the string.

In further embodiments, the database contains pre-computed variants of the descriptive terms that characterize the content items, and the mapping logic maps the incremental entries to the pre-computed variants. The pre-computed variants can be encoded according to the known layout of overloaded keys of the input device. Similarly, the mapping logic can generate variants in real time based on the incremental entries and use the variants to find the most likely content items corresponding to the incremental entries.

In yet further embodiments, the mapping logic includes dynamic intersection logic. The dynamic intersection logic identifies a first set of content items corresponding to a first set of alphanumeric symbols in the string and identifies a second set of content items corresponding to a second set of alphanumeric symbols in the string. The dynamic intersection logic includes content items appearing in both the first and second set of content items in the most likely content items corresponding to the incremental entries, but can exclude content items not appearing in both sets. The dynamic intersection logic can be invoked with each user query, or the dynamic intersection logic can be invoked when the number of most likely content items returned by the mapping logic without the dynamic intersection logic is below a predetermined threshold.

In some embodiments, the most likely content items are presented on a display device in accordance with at least one of personalized user preferences, popularity of the content items, temporal relevance of the content items, location relevance of the content items, recency of the content items, and relevance of the descriptive terms to the content items. The display device can be a display-constrained device, e.g., a wireless communication device, a mobile phone, a PDA, a personal media player, or a television. Similarly, the input device can be an input constrained device, e.g., a wireless communication device, a mobile phone, a PDA, a personal media player, or a television remote control.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which:

FIG. 6 illustrates a keypad with overloaded keys in accordance with the prior art;

DETAILED DESCRIPTION

Figure 1:
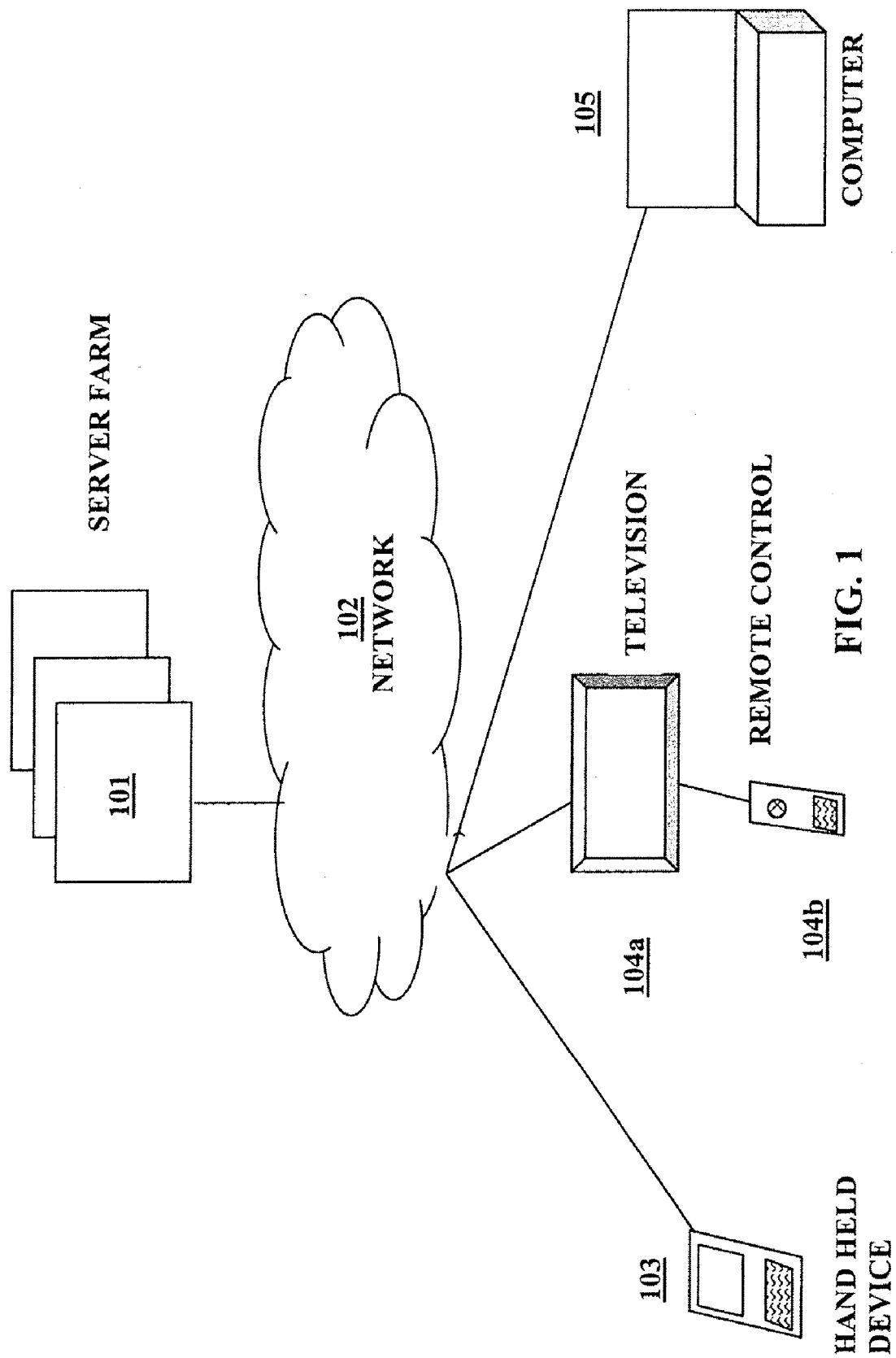
FIG. 1 illustrates a text entry system in accordance with one or more embodiments of the invention being used in a wide range of configurations.

Embodiments of the invention include methods and systems for creating an error compensated searchable catalog of items and using descriptive search terms prefix strings to incrementally search the catalog despite typographic and orthographic errors contained in said prefixes. In an illustrative embodiment, the catalog contains terms and phrases that describe items of interest to a user of the system. The catalog also contains prefixes and/or word fragments of the individual terms, as well as misspelled orthographic and typographic equivalents of the terms, along with their respective prefixes and fragments. The items of interest may include, for example, content items (such as television shows or movies) or data items (such as address book records or to do list items).

Once the catalog of terms is created, the user may search the catalog using prefixes of the descriptive terms. As the user enters ambiguous alphanumeric characters of a term the user is using to describe the desired item, the system incrementally searches the encoded catalog to find matches for the ambiguous prefix input. Because the system compares the user's input to the pre-computed error-compensated descriptive terms, term prefixes, and term word fragments, the illustrative embodiment provides for automatic correction of orthographic and typographic misspellings. In addition, the system allows the user to search the catalog by using orthographic and typographic variations that require less keystrokes. These variations can take the form of known homonyms, e.g., "aft" may be substituted for "aught", as in "draft/draught", and "it" may be substituted for "ight", as in "nite/night", or the user may employ intentional phonetic misspellings, e.g., "f" may be substituted for "ph", as in "fantom/phantom", "Johnston" may be misspelled as "Johnson", etc.

Embodiments of the present invention build on techniques, systems and methods disclosed in earlier filed applications, including but not limited to U.S. patent application Ser. No. 11/235,928, filed Sep. 27, 2005, entitled "Method and System for Processing Ambiguous, Multi-term Search Queries" and U.S. patent application Ser. No. 11/312,908, filed Dec. 20, 2005, entitled "Method and System for Dynamically Processing Ambiguous, Reduced Text Search Queries and Highlighting Results Thereof"; the contents of which are hereby incorporated by reference in their entirety. Those applications taught specific ways to incrementally process search queries containing search term prefixes formed from ambiguous text input. Similarly, embodiments presented herein may be used with the techniques, systems, and methods disclosed in earlier filed applications, including but not limited to U.S. patent application Ser. No. 11/356,788, filed Feb. 17, 2006, entitled "Method and System For Offsetting Network Latencies During Incremental Searching Using Local Caching and Predictive Fetching of Results From A Remote Server"; the contents of which are hereby incorporated by reference in their entirety. That application taught specific ways to retrieve and order content items for presentation to the user. The present techniques, however, are not limited to systems and methods disclosed in the incorporated patent applications. Thus, while reference to such systems and applications may be helpful, it is not believed necessary to understand the present embodiments or inventions.

FIG. 1 schematically illustrates an overall system for performing searches with reduced text entry using a wide range of devices in accordance with one or more embodiments of the invention. A server farm 101 can serve as the source of search data and relevance updates with a network 102 functioning as the distribution framework. The distribution framework could be a combination of wired and wireless connections. Examples of possible networks include cable television networks, satellite television networks, IP-based television networks, wireless and wired phone networks. The search devices could have a wide range of interface capabilities such as a hand-held device 103 (e.g., a telephone or PDA) with limited display size and a limited keypad, e.g., a keypad with overloaded keys, a small QWERTY keypad, or other keypad. The search devices could also include a television system 104a coupled with a remote control device 104b having a keypad with overloaded keys, a small QWERTY keypad, or other keypad. Finally, the search device could include a Personal Computer (PC) 105 with a full QWERTY or other keyboard and a computer display. FIG. 6 provides one example of a keypad having overloaded keys. In that example, keys corresponding to the numerals 2-9 have sets of alphanumeric characters associated with them.

Figure 2:
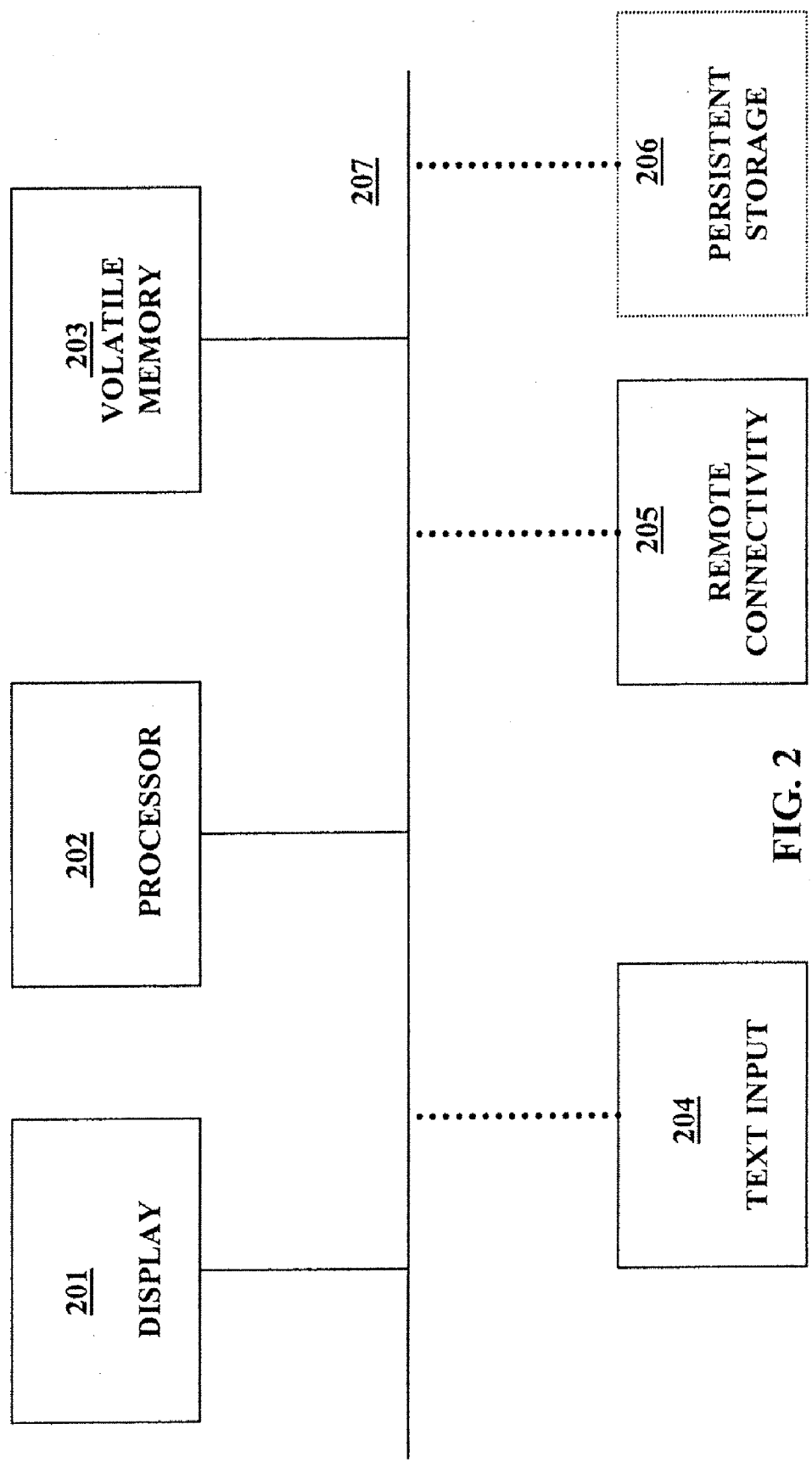
FIG. 2 illustrates a system configuration to perform text entry in accordance with one or more embodiments of the invention.

FIG. 2 illustrates exemplary device configurations for performing searching in accordance with one or more embodiments of the invention. In one configuration, the television system 104a has a display 201, a processor 202, volatile memory 203, text input interface 204, remote connectivity 205 to the server farm 101 through the network 102, and a persistent storage 206. These elements may be contained in one device, or be connected through wired or wireless techniques 207.

In another possible device configuration, the handheld device 103 and television system 104a might not have local persistent storage 206. In such a configuration, the device can use remote connectivity 205 to submit the query to a server farm 101 and retrieve results from it.

In another exemplary configuration, the television system 104a may not have remote connectivity 205. In this configuration, the search database may be locally resident on a local persistent storage 206. The persistent storage 206 may be a removable storage element such as SD, SmartMedia, CompactFlash card etc.

In a configuration of the television system with remote connectivity 205 and persistent storage 206 for searching, the device may use the remote connectivity for search relevance data update or for the case where the search database is distributed on the local storage 206 and on the server 101.

In one or more embodiments of the invention, a television system 104a may have a set-top box with a one-way link to a satellite. In this configuration, all search data including relevance updates may be downloaded to the device through the satellite link to perform local search. Relevance updates could be periodically done through this link.

Figure 3:
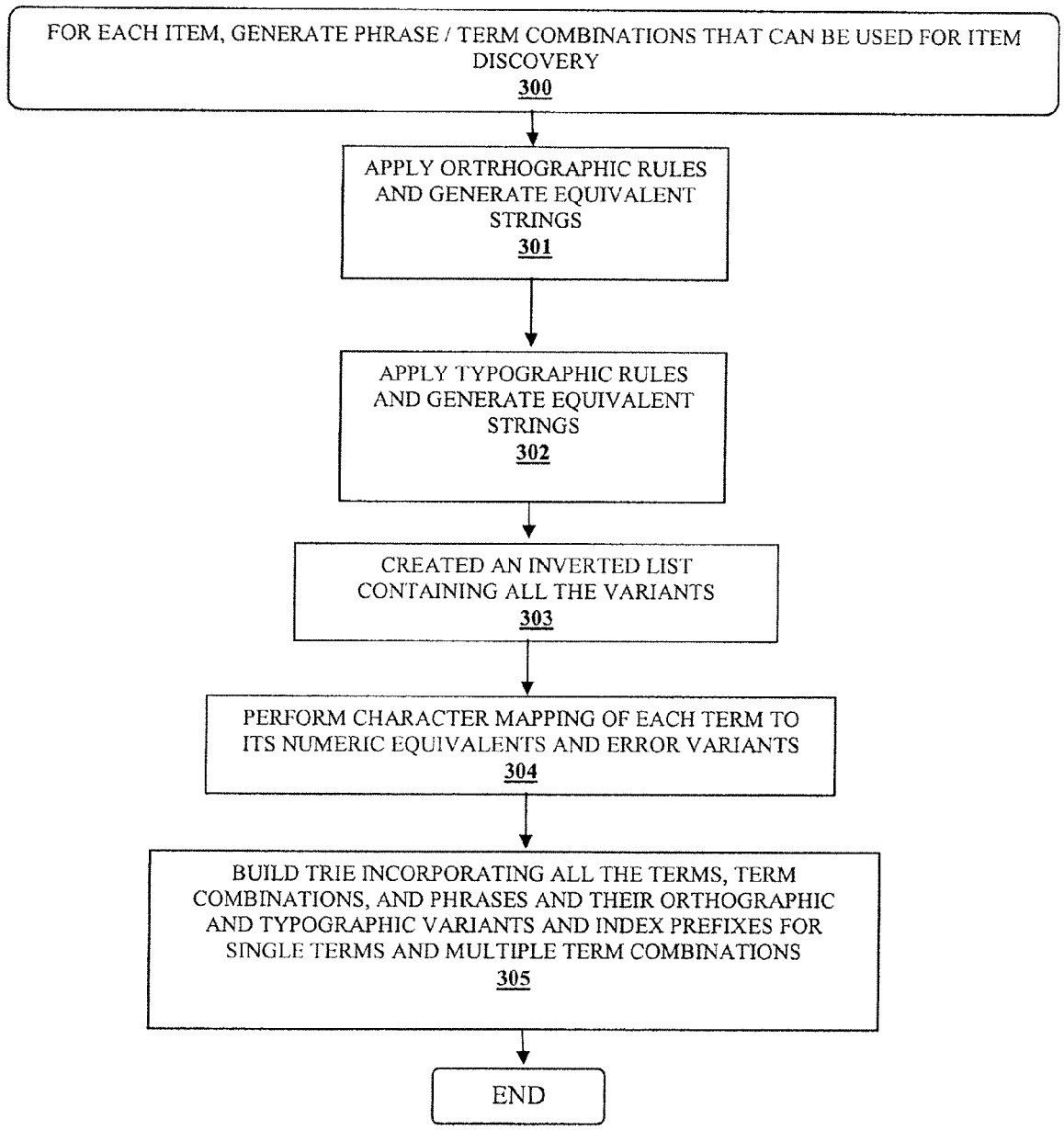
FIG. 3 is a flow chart illustrating the process flow for a pre-computation scheme of indexing typographic and orthographic equivalents of each term of the search space in accordance with one or more embodiments of the invention.

FIG. 3 illustrates the pre-computation operations performed for orthographic and typographic error resilience, in one or more embodiments of the invention. This operation is performed on single and multiple descriptive terms constituting a phrase (e.g. "Armageddon", "The guns of Navarone", "Tom Cruise" and "Cruise Tom") that can be used for item discovery in the search space. First, the method identifies ordered and unordered phrase and/or term combinations that describe the items of interest to the user (step 300). Steps 301 and 302 apply orthographic and typographic rules on the terms constituting phrases to generate orthographic and typographic variants of the original terms. In an embodiment of the invention, the orthographic rules for generating variants of terms include (1) dropping of all vowels (e.g. "shylck pcn" for "shylock pacino"), (2) using a SOUNDEX-like equivalence class for creating phonetically similar term variants ("fone" and "phone"), and (3) applying rules that further capture phonetic equivalence at specific character locations in a word. The orthographic rules can include those described in Patent Application No. 60/739,893, incorporated above, but embodiments of the invention are not limited to these rules.

Typographic variant generation rules include generating N-gram word fragments for each descriptive term or phrase. N-grams are incomplete portions of descriptive terms or phrases containing N number of characters, e.g., trigrams are a species of N-grams having three characters. The characters in the N-grams can be ordered according to the characters' ordering in the term or phrase, but the characters can be non-sequential. In the illustrative embodiment of the invention, multiple trigrams are generated for each term by dropping characters from the term, e.g., "pci", "pac", "aci", "acn", "cin", "cio", etc. for "pacino". N-grams may also be formed for a descriptive phrase. For example, quadgrams for the phrase "al pacino" include "a_pa", "al_p", "a_pc", etc. These variants help compensate for typical orthographic and typographic misspellings that users make. These errors are in essence errors of insertion (e.g., "alledge" instead of "allege"), deletion (e.g., "tomorow" instead of "tomorrow", "Johnson" instead of "Johnston"), substitution (e.g., "crutial" instead of "crucial", "edlipse" instead of "eclipse"), and transposition (e.g., "sienfeld" instead of "seinfeld"), which generate phonetic equivalents of the intended search term. In some embodiments, N-gram prefixes can be formed by limiting the number of characters dropped from the front of the descriptive term or phrase, e.g., dropping only the first character. Thus, trigram prefixes for the term "pacino" can include "pci", "pac", "aci", and "acn". However, in this example, "cin" and "cio" would not be generated because more than the first letter would need to be dropped.

In accordance with one or more embodiments of the invention, at step 303, an inverted list is created for prefix and fragment strings of single and multiple term combinations as well as unordered term combinations determined in step 300 that went through the variants generation process in steps 301 and 302. One example of an inverted list is a collection of content items, related descriptive terms and phrases, and their error-resilient variants that is indexed on the descriptive terms and phrases and their variants. The inverted list entries are all mapped to their numeric equivalents 304 where the mapping is based on the keypad layout, an example of which is shown in FIG. 6. For instance, a letter "A", "B", or "C" would be mapped to a numerical "2", while a letter "J", "K", or "L" would be mapped to a numerical "5". Other device specific mappings are used for keypads that have different overloaded key layouts. Thus, when the user enters input text, the device type is used to determine the choice of mapping for performing incremental search.

The users may also press incorrect adjacent keys on the keypad of the interface device when attempting to enter a search term prefix. For example, the user may wish to enter the prefix "sei" for the descriptive term "seinfeld". The encoded string for this prefix using the keypad shown in FIG. 6 is "734". However, the user may accidentally enter "731" because the "1" and "4" keys are adjacent. Therefore, in embodiments of the invention, step 304 also includes adding typographic error variants of the encoded prefixes to the inverted list. These typographic error variants are compiled based on which keys are adjacent on the keypad layout of the user entry device. Thus, the "1", "5", and "7" keys can be substituted for the "4" key when building the typographic error variants, while the "3", "6", and "9" keys would not be. The diagonally adjacent keys "2" and "8" can also be substituted for the "4" key, depending upon the spacing of the keys and the likelihood of the user accidentally pressing them. In addition, transposition error variants can be generated based on the encoded strings. In the alternative, transposition error variants can be generated during the N-gram generation process.

The encoded inverted list is then converted to trie data structure 305. A trie data structure, also known as a prefix tree, is an ordered tree structure that is used to store strings. All the descendents of any one node of the trie data structure have a common prefix of the string associated with that node. In the illustrative embodiment, trie data structure 305 indexes prefix variants of all terms and phrases (e.g., "a_, ap_, apo_" for "apocalypse" where "_" represents space character) and variants of unordered term combinations (e.g., "t_cruise", to_cruise", "c_tom", "cr_tom"). The length of the prefix for each term that is indexed and the number of terms in the term combinations whose prefixes are indexed are configurable parameters, which is determined based on memory available and retrieval time desired (memory and retrieval time being a trade-off). This static multiple term prefix indexing builds error resilience into the system. The resilience is achieved by indexing the prefixes of the variants of the original term and term combinations.

Figure 4:
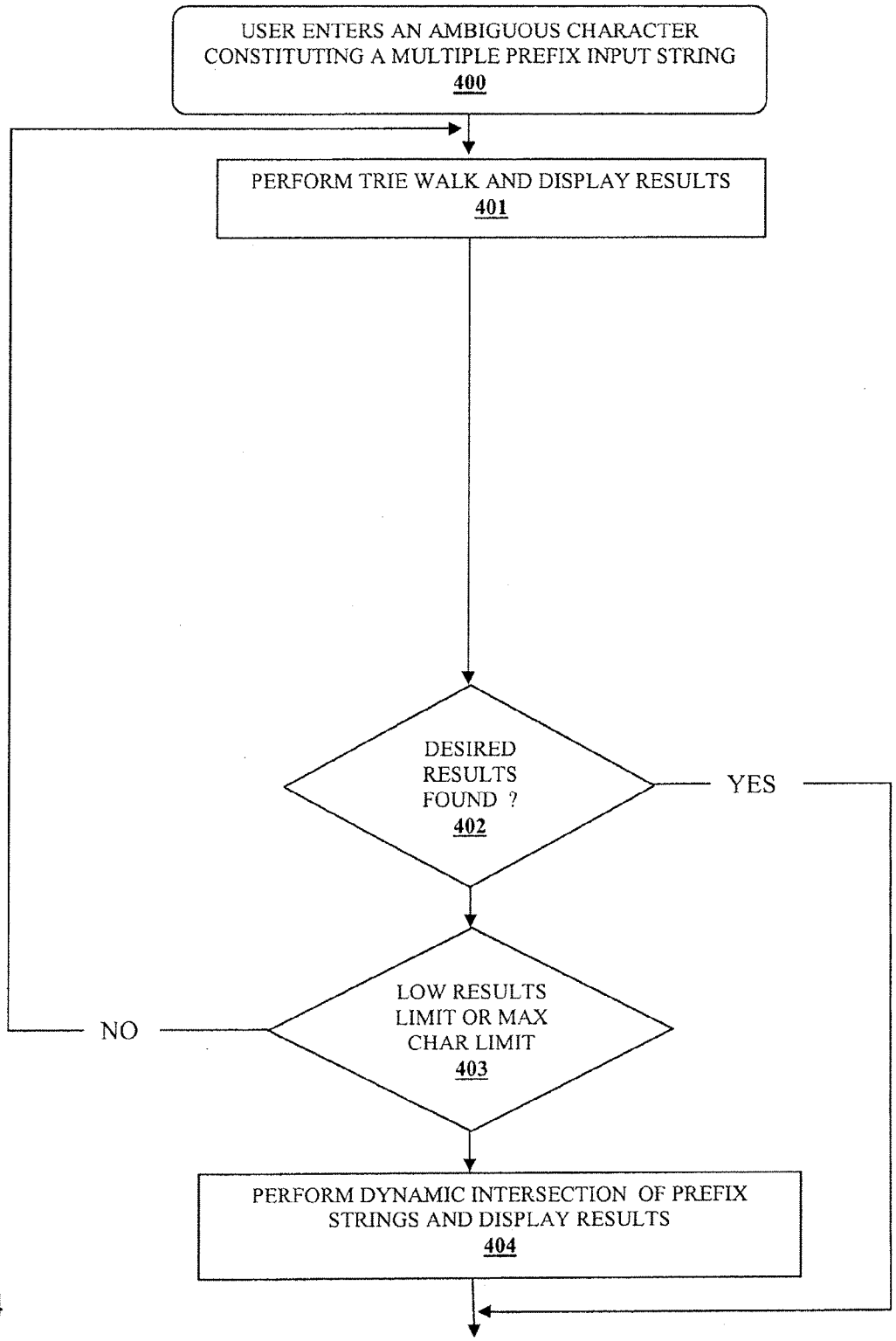
FIG. 4 is a flow chart illustrating the action flow sequence as the user enters each character of the query string in accordance with one or more embodiments of the invention.

FIG. 4 illustrates the operations performed, in one or more embodiments of the invention, on each terms space (e.g. an encoded inverted list), as the user enters a multiple prefix query string 400 where the input string includes ambiguous encoded text (e.g. such as that created using the keypad shown in FIG. 6. The input string would then be used to descend down a trie data structure as described in FIG. 5 (step 401). One example of a trie structure used for incremental searching is described in U.S. patent application Ser. No. 11/136, 261, filed May 24, 2005, entitled "Method And System For Performing Searches For Television Content Using Reduced Text Input," which is incorporated by reference herein in its entirety. During this descend down the trie, a multi-prefix query string with errors may be compensated for, by the error compensation scheme described above.

For example, an input of the form "GN NV" would yield the results for "gun navarone" with the error compensation accomplished by the pre-computation scheme described earlier. If the desired result is not found (step 402) and the returned results fall below a certain limit or the upper limit for trie descent is reached (step 403), then a dynamic intersection is performed (step 404). The dynamic intersection uses the information from the multiple prefix strings to compensate for the error in the input of an individual term; the intersection matches user-entered prefixes to entries in the inverted list in order to find descriptive terms. If the user entry contains errors, distance functions known in the art are used to assign penalties for each error. For example, a penalty value is assigned for each addition, deletion, substitution, or transposition that must be performed to make an input match a term or phrase prefix in the inverted list. This comparison can be done on disambiguated input or on the encoded ambiguous input. In addition, these functions are used in conjunction with the error-resilient entries in the inverted list to approximate what terms the user intended to enter. If the total penalty exceeds a threshold, the input string is not considered for further processing.

As described above, each descriptive term is associated with items that may be of interest to the user. Thus, each user-entered prefix will have a set of items associated with the prefix. These sets are intersected to reveal items that are associated with all (or many) of the prefixes. These items are then presented to the user. Each set of items associated with the prefixes may be ordered and/or ranked according to various criteria, e.g., popularity of the item, geographic relevance of the item given the user's location, temporal relevance of the item, etc. The techniques described in U.S. patent application Ser. No. 11/246,432, filed Oct. 7, 2005, entitled "Method and System for Incremental Search with Reduced Text Entry Where the Relevance of Results is a Dynamically Computed Function of User Input Search String Character Count," herein incorporated by reference, may also be used to rank and/or order the sets of items. The ranking and/or ordering of items can be used to boost certain items expected to be of interest to the user. Thus, although a particular user-entered search string may have a relatively high total penalty, if the prefixes containing errors are matched with error-resilient entries in the inverted list that are associated with particularly popular or relevant items, these items can be presented as results to the user.

For example, the user may be searching for the movie "The Merchant of Venice". The user knows the movie involves the actor Al Pacino playing the role of "Shylock". Thus, the user enters the search string "shyl pcno" for the descriptive terms "Shylock" and "Pacino". The dynamic intersection uses the combined information associated with these two terms to find the item of interest to the user. To further illustrate, the descriptive term "Shylock" can be associated with the items "William Shakespeare", "moneylender", "The Merchant of Venice", and "Laurence Olivier". The descriptive term "Pacino" can be associated with the items "The Godfather", "Michael Corleone", "Scent of a Woman" and "The Merchant of Venice". Thus, when these sets of items are intersected, the item "The Merchant of Venice" is in common to both descriptive terms, and it is presented to the user.

Figure 5:
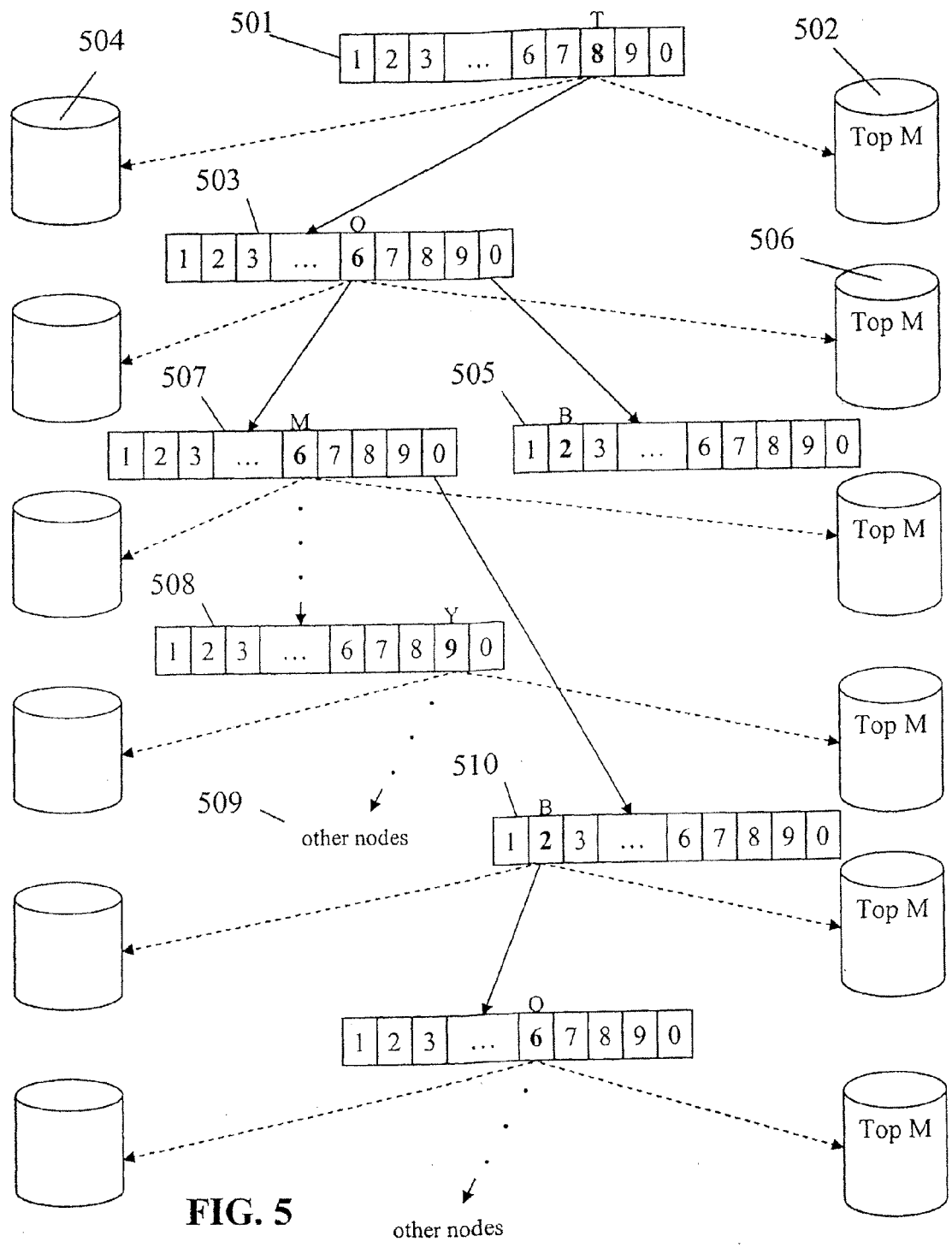
FIG. 5 illustrates a data structure for retrieving results incrementally for each ambiguous input character.

FIG. 5 illustrates an embodiment of the invention using a trie data structure where each node (e.g. node 501) has numerical values from 0-9. The numerical value of each node represents an alphanumeric character input by the user that has been encoded according to the numerical encoding scheme employed when creating the encoded inverted list in connection with step 304 of FIG. 3. Each node has associated top M items of interest 502 that have descriptive terms and/or prefixes, encoded as described above, that match the numerical value of the node. Likewise, sequential node combinations (such as 501 and 503) have associated top M items of interest that have encoded descriptive terms and/or prefixes that match the combined numerical values of the nodes. These top M records can be held in "in-memory" storage on the user's interface device. These records are returned immediately to the user based on the match string. If the user does not find the desired item in the top M records, additional items are retrieved from a secondary storage structure 504 using the trie data structure present there or a dynamic intersection.

FIG. 5 shows the layout of the data structure for the terms "TOMMY BOY" using a keypad of the type shown in FIG. 6. The number of prefix terms and the size of the prefix terms used for pre-computing the trie index are determined by the memory availability and computational capabilities of the system. In the illustration, the size of the prefix terms is 2 and the number of terms for pre-computing the trie index is 2. Thus, the user may enter a variety of encoded prefix strings to search for items associated with the terms "TOMMY BOY", e.g., "8 269"(T BOY),"86 269"(TO BOY), "8 2"(T B), and "86 2"(T BO).

The user starts the search by entering the numeral "8", which corresponds to the letter "T" on the keypad of FIG. 6. The system immediately returns top M records 502 matching the "T" prefix. Next, the user can choose to enter more characters of the first prefix by entering the numeral "6" for the letter "O" or the user could begin a new prefix by entering the numeral "0" for a space character (at node 503) followed by a "2" for the letter "B" (at node 505). In this case, top M records for the prefix combination "$T_{13}$ B" would be returned (not shown). In addition, because the user has entered more than one term prefix, the system can perform a dynamic intersection on the two terms.

If the user enters a "6", the system returns top M records 506 having associated descriptive terms matching the prefix "86". As above, the user can choose to enter more prefix characters for the term "TOMMY", following nodes 507 through 508, and then begin to enter the prefix for the term "BOY" (represented by nodes not shown at 509). In the alternative, the user can enter a "0" for a space character (at node 507) and begin to enter prefix characters for the term "BOY", starting at node 510. With each entry, the system responds with items from the top M records, items from the secondary storage, and/or items from a dynamic intersection as described above.

The embodiments described above provide error-resilience by applying the error models disclosed to the descriptive terms and phrases on a pre-computed basis. However, other embodiments of the invention provide for applying the error models disclosed on the user input in real time. For example, error-resilient variants of the user input can be formed using the techniques described above, and these variants can be matched against a catalog of descriptive terms and phrases in order to find desired content items. For some of the techniques, the inverse operation of the technique would be performed on the user input, e.g., the ambiguous numeric user input would be decoded into the possible unambiguous alphanumeric string combinations. Yet further embodiments include applying the disclosed techniques in a combined fashion with some of the techniques being applied on a pre-computed basis, while others are performed in real time.

Embodiments can have mapping logic that cooperates with a database containing content items and descriptive terms and phrases to identify content items most likely to be of interest to the user based on the user's search input. This mapping logic can perform a database lookup given a particular search input string, and the logic can handle variants of the search input string and/or variants of the descriptive terms and phrases created according to the error models described above. For example, the mapping logic can generate input string variants in real time according to the error models provided above and use these variants to perform a database lookup. Likewise, the mapping logic can use an input string to perform a database lookup in which the database contains pre-computed variants of descriptive terms and phrases created according to the error models. In either embodiment, the mapping logic handles variants and performs a database lookup to determine the most likely content items sought by the user.

Embodiments of the invention can be used with devices that have a physical keypad with overloaded keys or with virtual keypads having overloaded keys. U.S. patent application Ser. No. 11/509,909, filed Aug. 25, 2006, entitled "User Interface For Visual Cooperation Between Text Input And Display Device", herein incorporated by reference, describes systems and methods for entering text into a search interface using an image of a virtual user alphanumeric interface on a presentation device. Embodiments of the present invention can be used with the virtual keypads described in that application. Thus, the user may provide search input through physical keystrokes on a physical keypad or through virtual keystrokes on a virtual keypad.

As will be realized, the invention is capable of other and different embodiments and its several details may be capable of modifications in various respects, all without departing from the invention as set out in the appended claims. For example, records from the secondary data sources mentioned above can be retrieved in parallel with those taken from the top M records, and the records can be presented to the user as they become available. Accordingly, the drawings and description are to be regarded as illustrative in nature and not in a restrictive of limiting sense, with the scope of the application being indicated in the claims.

What is claimed is:

1. A computer-implemented user-interface system for incrementally finding and presenting one or more items in response to keystrokes entered by a user on an input device having a known layout of overloaded keys selected from a set of overloaded key layouts, each overloaded key having a corresponding set of alphanumeric symbols, the system comprising:

a database stored in a computer memory, the database containing a catalog of items and corresponding descriptive terms that characterize the items, wherein the items include at least one of content items and data items; and a computer memory comprising instructions for causing a computer system to:

determine which known layout of overloaded keys of the set of overloaded key layouts is present on the input device;

receive a sequence of incremental keystrokes from the user;

in response to each incremental keystroke of the sequence of incremental keystrokes, build a string corresponding to the sequence, each entry in the string having the set of alphanumeric symbols associated with a corresponding keystroke of the sequence of incremental keystrokes;

in response to each incremental keystroke of the sequence of incremental keystrokes, map the string to the database to find the most likely items corresponding to the sequence of incremental keystrokes, the mapping being in accordance with a defined error model, the error model providing for at least one suggested correction in the string wherein at least one keystroke of the sequence of incremental keystrokes is replaced by at least one alphanumeric symbol based on the known layout of overloaded keys of the input device and based on the alphanumeric symbols associated with said overloaded keys, and wherein the at least one alphanumeric symbol that replaces the at least one keystroke of the sequence of incremental keystrokes is an alphanumeric symbol from a set associated with a keystroke other than the keystroke being replaced; and in response to each incremental keystroke of the sequence of incremental keystrokes, order and present the most likely items on a display device in accordance with defined ordering criteria such that the user-interface system receives ambiguous entries from the user and presents the most likely matching items in response to the entries.

2. The system of claim 1, wherein the error model associates the string with suggested corrections for typographic errors corresponding to incremental user entries, and wherein the suggested corrections are derived by replacing characters in the string resulting from one or more accidentally pressed adjacent keys.

3. The system of claim 1, wherein the error model associates the string with suggested corrections for orthographic errors corresponding to incremental user entries, and wherein the suggested corrections are derived by replacing one or more characters in the string resulting from phonetic substitutions.

4. The system of claim 1, wherein the content items include at least one of television shows and movies.

5. The system of claim 1, wherein the data items include at least one of address book records and to do list items.

6. A computer-implemented method of incrementally finding and presenting one or more items in response to keystrokes entered by a user on an input device having a known layout of overloaded keys selected from a set of overloaded key layouts, each overloaded key having a corresponding set of alphanumeric symbols, the method comprising:

providing access to a database stored in a computer memory, the database containing a catalog of items and corresponding descriptive terms that characterize the items, wherein the items include at least one of content items and data items;

determining which known layout of overloaded keys of the set of overloaded key layouts is present on the input device;

receiving a sequence of incremental keystrokes from the user;

in response to each incremental keystroke of the sequence of incremental keystrokes, building a string corresponding to the sequence, each entry in the string having the set of alphanumeric symbols associated with a corresponding keystroke of the sequence of incremental keystrokes;

in response to each incremental keystroke of the sequence of incremental keystrokes, mapping the string to the database to find the most likely items corresponding to the sequence of incremental keystrokes, the mapping being in accordance with a defined error model, the error model providing for at least one suggested correction in the string wherein at least one keystroke of the sequence of incremental keystrokes is replaced by at least one alphanumeric symbol based on the known layout of overloaded keys of the input device and based on the alphanumeric symbols associated with said overloaded keys, and wherein the at least one alphanumeric symbol that replaces the at least one keystroke of the sequence of incremental keystrokes is an alphanumeric symbol from a set associated with a keystroke other than the keystroke being replaced; and in response to each incremental keystroke of the sequence of incremental keystrokes, ordering and presenting the most likely items on a display device in accordance with defined ordering criteria such that the user-interface system receives ambiguous entries from the user and presents the most likely matching items in response to the entries.

7. The method of claim 6, wherein the error model associates the string with suggested corrections for typographic errors corresponding to incremental user entries, and wherein the suggested corrections are derived by replacing characters in the string resulting from one or more accidentally pressed adjacent keys.

8. The method of claim 6, wherein the error model associates the string with suggested corrections for orthographic errors corresponding to incremental user entries, and wherein the suggested corrections are derived by replacing one or more characters in the string resulting from phonetic substitutions.

9. The method of claim 6, wherein the content items include at least one of television shows and movies.

10. The method of claim 6, wherein the data items include at least one of address book records and to do list items.

* * * * *